United States Patent
Park et al.

(10) Patent No.: US 11,999,762 B2
(45) Date of Patent: Jun. 4, 2024

(54) PHOSPHINE PRECURSOR FOR PREPARING QUANTUM DOT AND QUANTUM DOT PREPARED THEREFROM

(71) Applicant: SK CHEMICALS CO., LTD., Gyeonggi-do (KR)

(72) Inventors: Jeong Ho Park, Gyeonggi-do (KR); Hee Il Chae, Seoul (KR); Kyung Sil Yoon, Gyeonggi-do (KR); Ju-Sik Kang, Gyeonggi-do (KR); Yu Mi Chang, Gyeonggi-do (KR); Nam-Choul Yang, Seoul (KR); Jae Kyun Park, Seoul (KR); Song Lee, Seoul (KR)

(73) Assignee: SK Chemicals Co., Ltd. (KR)

( * ) Notice: Subject to any disclaimer, the term of this patent is extended or adjusted under 35 U.S.C. 154(b) by 0 days.

(21) Appl. No.: 17/715,470

(22) Filed: Apr. 7, 2022

(65) Prior Publication Data

US 2022/0235077 A1    Jul. 28, 2022

Related U.S. Application Data

(62) Division of application No. 16/613,884, filed as application No. PCT/KR2018/005627 on May 16, 2018, now abandoned.

(30) Foreign Application Priority Data

May 18, 2017    (KR) .................. 10-2017-0061800

(51) Int. Cl.
C07F 9/06    (2006.01)

(52) U.S. Cl.
CPC ...................... C07F 9/06 (2013.01)

(58) Field of Classification Search
CPC ........................................ C07F 9/06
See application file for complete search history.

(56) References Cited

U.S. PATENT DOCUMENTS

| | | | |
|---|---|---|---|
| 10,934,316 B2 | 3/2021 | Takubo et al. | |
| 2007/0049765 A1 | 3/2007 | Lucey et al. | |
| 2008/0020235 A1 | 1/2008 | Parce et al. | |
| 2019/0263845 A1 | 8/2019 | Takubo et al. | |
| 2020/0140467 A1 | 5/2020 | Park et al. | |

FOREIGN PATENT DOCUMENTS

| | | |
|---|---|---|
| JP | 2010-535262 | 11/2010 |
| KR | 10-1043311 | 6/2011 |
| KR | 10-2013-0080333 | 7/2013 |
| KR | 10-2016-0059327 | 5/2016 |
| WO | WO 2006/034280 | 3/2006 |
| WO | WO 2016/080683 | 5/2016 |

OTHER PUBLICATIONS

Petrie et al., J Chem. Soc. Dalton Transactions, (1993), 1737-1745.*
Fritz et al., Z. Anorg. Allg. Chem., (1977), v422, p. 104-114.*
Gary et al. "Role of Acid in Precursor Conversion During InP Quantum Dot Synthesis," Chemistry of Materials, 2013, vol. 25, pp. 2463-2469.
Hassler "Synthese und Kernresonanzspektren von Methylphenyl-substituierten Trisilylphosphanen PSi3MenPh9-n," Monatshefte Fur Chemi, Jan. 1988, vol. 119, No. 22, pp. 851-862.
Holderich et al. "Reactions of Hexamethylsilirane with Primary and Secondary Phosphines and with Chlorophosphines," Journal of Organometallic Chemistry, 1978, vol. 153, pp. 299-304.
Petrie et al. "Synthesis and Characterization of the Monomeric Phosphinogallanes But2GaPR'R" (R',R" = buldky aryl or silyl groups) and Related Compounds," Journal of the Chemical Society, Dalton Transactions, 1993, pp. 1737-1745.
Westerhausen et al. "Synthesis and Dynamic Behavior of the Dimeric, Monocyclic Barium Bis[bis(isopropyldimethylsilyl)phosphanide]—Molecular Structures of P(SiMe2Ph)3, of Monomeric (thf)4Ba[P(SiMe2iPr)2]2 and of the Dimer {(thf)2Ba[P(SiMe2iPr]2]2}2," Chemische Berichte, 1996, vol. 129, No. 9, pp. 1035-1040.
Translated International Search Report for International (PCT) Patent Application No. PCT/KR2018/005627, dated Aug. 28, 2018, 2 pages.
International Search Report and Written Opinion for International (PCT) Patent Application No. PCT/KR2018/005627, dated Aug. 28, 2018, 12 pages.
Extended Search Report for European Patent Application No. 18803204.9, dated Nov. 13, 2020, 6 pages.
Official Action for U.S. Appl. No. 16/613,884, dated Apr. 29, 2020 9 pages Restriction Requirement.
Official Action for U.S. Appl. No. 16/613,884, dated Jul. 17, 2020 7 pages.
Official Action for U.S. Appl. No. 16/613,884, dated Jan. 27, 2021 10 pages.
Official Action for U.S. Appl. No. 16/613,884, dated May 14, 2021 9 pages.
Official Action for U.S. Appl. No. 16/614,884, dated Oct. 7, 2021 9 pages.
Fritz et al. "Monolithinierte Silylphosphane," Zeitschrift für anorganische und allgemeine Chemie, 1976, vol. 422, pp. 104-114 (English abstract).
Fritz et al. "Über den Einfluß der Substituenten im (R3Si)2(P—Si)R2Cl auf Bildung und Eigenschaften der Hexasila-tetraphosphadantane und deren 31P-NMR-Spektren, "Zeitschrift für anorganische und allgemeine Chemie, Aug. 1989, vol. 575, pp. 39-54.
Demuth et al. "Darstellung und charakterisierung von (CF3)2PPH2 und (CF3)2AsPH2," Jounral of Fluorine Chemistry, Jan. 1973, vol. 2, No. 3, pp. 269-279 (English summary).

(Continued)

*Primary Examiner* — Yong L Chu
(74) *Attorney, Agent, or Firm* — Sheridan Ross P.C.

(57) ABSTRACT

The present invention relates to a phosphine precursor for the preparation of a quantum dot, and a quantum dot prepared therefrom. Using the phosphine precursor for the preparation of a quantum dot of the present invention, a quantum dot with improved luminous efficiency and higher luminous color purity can be provided.

6 Claims, 1 Drawing Sheet

(56) References Cited

OTHER PUBLICATIONS

Joung et al. "Facile synthesis of uniform large-sized InP nanocrystal quantum dots using tris(tert-butyldimethylsilyl)phosphine," Nanoscale Research Letters, 2012, vol. 7, article 93, 8 pages.

Scherer et al. "Inversionsbarriere eines Trissilylphosphins," Journal of Organometallic Chemistry, 1972, vol. 40, pp. C64-C66.

Von Hanisch et al. "Synthesis and Characterisation of Molecular Bismuth Phosphorus Compounds Containing Bi2 Units with Bi—Bi Single and Double Bonds," European Journal of Inorganic Chemistry, 2006, vol. 2006, No. 23, pp. 4770-4773.

Westerhausen et al. "NMR-spektroskopische und strukturelle Charakterisierung der Tri-iso-propylsilylphosphanide des Calciums," Journal of Organometallic Chemistry, 1996, vol. 513, pp. 213-229 (English abstract).

\* cited by examiner

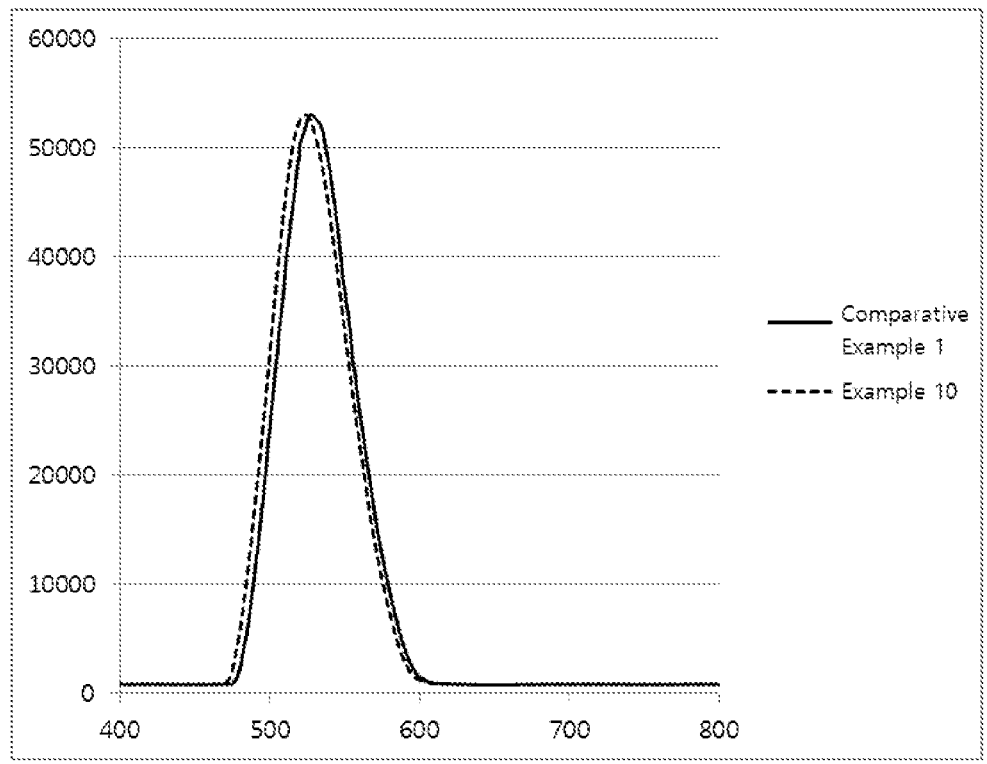

PHOSPHINE PRECURSOR FOR PREPARING QUANTUM DOT AND QUANTUM DOT PREPARED THEREFROM

CROSS-REFERENCE TO RELATED APPLICATIONS

This application is a divisional of U.S. patent application Ser. No. 16/613,884, filed 15 Nov. 2019, which is a national-stage application under 35 U.S.C. § 371 that claims the benefit of PCT Application PCT/KR2018/005627, filed 16 May 2018 and designating the United States, which claims the benefit of Korean Patent Application No. 10-2017-0061800, filed 18 May 2017, the entireties of all of which are incorporated herein by reference.

BACKGROUND OF THE INVENTION

(a) Field of the Invention

The present invention relates to a phosphine precursor for the preparation of a quantum dot, and quantum dot prepared therefrom.

(b) Description of the Related Art

A nanocrystal referred to as a quantum dot (QD) is a material having a crystal structure of several nano to several tens of nano size, consists of hundreds to thousands of atoms, and has unique electrical, magnetic, optical, chemical and mechanical properties different from the unique properties of the original material itself, according to the unique crystal structure and particle size. And, by controlling the size of the nanocrystal, the above described properties can be controlled. Due to such properties, quantum dots are receiving great attention because they are highly likely to be applied for various devices such as next generation light emitting diodes (LED), organic/inorganic hybrid electroluminescent devices, inorganic electroluminescent devices, solar cell transistors, etc.

In order to secure excellent emission spectrum, a quantum dot is required to have high luminous efficiency and excellent color purity, wherein the color purity is evaluated as being excellent as full width at half maximum (FWHM) is narrower, and as the crystal size of a quantum dot is more uniform, namely, a quantum dot has a crystal of more uniform size, narrower full width at half maximum is exhibited.

A quantum dot is receiving attention due to high luminous efficiency and color reproducibility compared to the existing light emitting material, and among them, quantum dots using Group II-VI compounds of the periodic table have high luminous efficiency and luminous region, and thus, a lot of studies are being progressed thereon.

An InP quantum dot is a representative Group II-V quantum dot having a broad luminous region from visible ray to near infrared ray. However, in general, the InP quantum dot has somewhat low luminous efficiency and comparatively low color purity, compared to a CdSe-based quantum dot, and thus, a lot of studies for preparing an InP quantum dot having improved luminous efficiency have been progressed.

The InP quantum dot is prepared by reacting a phosphorus precursor with an indium precursor, and as the phosphorus precursor, a phosphine compound, TMSP (tris(trimethylsilyl)phosphine), is generally used.

However, since TMSP has a high risk of explosion and contains lethal toxicity, and the InP quantum dot prepared from TMSP by known methods cannot be considered as exhibiting sufficiently competitive color purity, there is a demand for the development of a phosphorus precursor that can prepare a quantum dot having narrower full width at half maximum instead of TMSP, and has secured process stability.

Korean Registered Patent No. 1043311 disclosed a method for preparing an InP quantum dot using tris(dimethyl tert-butyl)silyl phosphine ($P(SiMe_2\text{-tert-Bu})_3$) as a phosphorus precursor instead of TMSP.

However, since the tris(dimethyl tert-butyl)silyl phosphine, similarly to TMSP, has a tertiary phosphine structure wherein three identical ligands (dimethyl tert-butyl silyl group) are introduced in the central atom phosphorus(P), and does not have the effect of decreasing full width at half maximum compared to the quantum dot prepared using TMSP, it is not sufficient to replace TMSP, and there is a demand for a precursor capable of preparing a quantum dot with higher color purity.

SUMMARY OF THE INVENTION

It is an object of the present invention to provide a novel phosphine precursor and a quantum dot prepared therefrom, which enables the preparation of a quantum dot having more uniform crystal size, thus, exhibiting high color purity.

In order to solve the above problem, one aspect of the present invention provides a phosphine precursor for the preparation of a quantum dot, represented by the following Chemical Formula 1:

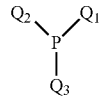

[Chemical Formula 1]

in the Chemical Formula 1,
$Q_1$ is

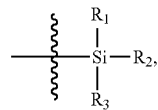

$Q_2$ is

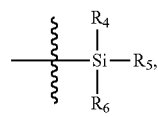

$Q_3$ is

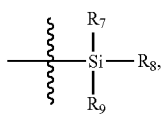

wherein $R_1$ to $R_9$ are identical to or different from each other, and each independently, C1-20 linear or branched alkyl, C6-30 aryl, C7-30 alkylaryl, or C7-30 arylalkyl, provided that all $Q_1$ to $Q_3$ are not the same structure.

Another aspect of the present invention provides a method for preparing the phosphine precursor.

Yet another aspect of the present invention provides a precursor composition for the preparation of a quantum dot, comprising the phosphine precursor.

Yet another aspect of the present invention provides a quantum dot prepared from the phosphine precursor.

Yet another aspect of the present invention provides a method for preparing a quantum dot using one or more kinds of the phosphine precursors.

The phosphine precursor for the preparation of a quantum dot according to the present invention, unlike TMSP conventionally used for the preparation of InP quantum dot, comprises asymmetric silyl ligands, and controls a reaction speed with other precursors by various substituents connected to the silyl ligand, thereby enabling the preparation of a quantum dot having more uniform crystal size.

Thus, using the precursor of the present invention, a quantum dot that has improved luminous efficiency and higher luminous color purity can be provided.

BRIEF DESCRIPTION OF THE DRAWINGS

FIG. 1 is a graph showing the emission properties of the quantum dots according to Examples and Comparative Examples.

DETAILED DESCRIPTION OF THE EMBODIMENTS

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a phosphine precursor for the preparation of a quantum dot, and a quantum dot prepared therefrom according to the present invention will be explained in more detail.

I. A Phosphine Precursor and a Method for Preparing the Same

The phosphine precursor for the preparation of a quantum dot according to one aspect of the present invention is represented by the following Chemical Formula 1:

[Chemical Formula 1]

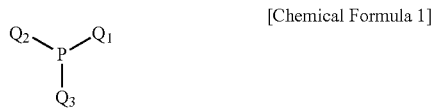

In the Chemical Formula 1,
$Q_1$ is

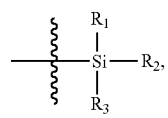

$Q_2$ is

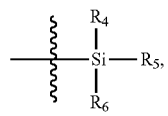

$Q_3$ is

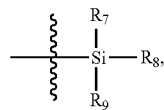

wherein $R_1$ to $R_9$ are identical to or different from each other, and each independently, C1-20 linear or branched alkyl, C6-30 aryl, C7-30 alkylaryl, or C7-30 arylalkyl, provided that all $Q_1$ to $Q_3$ are not the same structure.

A nanocrystal referred to as a quantum dot (QD) is a material having a crystal structure of several nano to several tens of nano size, consists of hundreds to thousands of atoms, and has unique electrical, magnetic, optical, chemical and mechanical properties different from the unique properties of the original material itself, according to the unique crystal structure and particle size. And, by controlling the size of the nanocrystal, the above described properties can be controlled.

Even if quantum dots are made of the same materials, the colors of light emitted may vary according to the size of nanocrystal. Due to the property, quantum dots are receiving great attention because they are highly likely to be applied for various devices such as next generation light emitting diodes (LED), organic/inorganic hybrid electroluminescent devices, inorganic electroluminescent devices, solar ells, transistors, etc.

In order to secure excellent emission spectrum, a quantum dot is required to have high luminous efficiency and excellent color purity, wherein the color purity is evaluated as being excellent as full width at half maximum (FWHM) is narrower, and as the crystal size of a quantum dot is more uniform, namely, a quantum dot has a crystal of more uniform size, narrower full width at half maximum is exhibited.

Factors controlling the crystal size of a quantum dot include reaction temperature, reaction time, etc., and one of them is to control the reaction speed between the precursors for the preparation of quantum dots.

Here, it is generally known that as the reactivity of precursors is lower, namely, as the reaction speed is slower, quantum dots having a crystal size of more uniform distribution are produced. However, the present inventors confirmed that as the reactivity of precursors is lower, the uniformity of the size of produced quantum dot is not necessarily proportional thereto, and that quantum dots having various properties that cannot be predicted may be prepared according to the structural characteristics of precursors, and based on the discovery, completed the present invention.

More specifically, the distribution of the crystal size of quantum dots appears to vary according to the structure of each ligand, and organic characteristics as a whole precursor, and is not simply predicted arithmetically.

Thus, the present inventors prepared quantum dots using various phosphine precursors for the preparation of a quantum dot, and evaluated the physical and optical properties of the prepared quantum dots, and as the result, confirmed that a quantum dot having excellent luminous efficiency and color purity can be provided by a phosphine precursor of the following Chemical Formula 1:

[Chemical Formula 1]

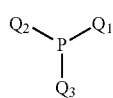

In the Chemical Formula 1,
$Q_1$ is

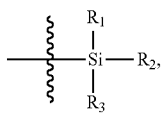

$Q_2$ is

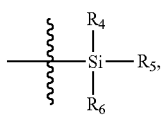

$Q_3$ is

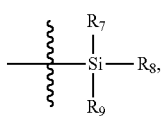

wherein $R_1$ to $R_9$ are identical to or different from each other and, each independently, C1-20 linear or branched alkyl, C6-30 aryl, C7-30 alkylaryl, or C7-30 arylalkyl, provided that all $Q_1$ to $Q_3$ are not the same structure, namely, all $R_1$ to $R_9$ are not the same.

The phosphine precursor for the preparation of a quantum dot of the Chemical Formula 1 is a compound for novel use, of which use as a precursor for the preparation of a quantum dot has not been known.

The phosphine precursor of the Chemical Formula 1 is characterized in that three ligands($Q_1$, $Q_2$, $Q_3$) of phosphorus(P) are silyl ligands substituted with various hydrocarbon groups such as alkyl, aryl, alkylaryl or arylalkyl, and that all the $Q_1$, $Q_2$, and $Q_3$ are not the same structure, and two or more of the three ligands are different from each other. The bulkiness of the whole precursor is variously controlled according to the kind of the substituents connected to the silyl ligand, and thus, reactivity varies in reactions with other precursors for the preparation of quantum dots.

Namely, the phosphine precursor for the preparation of a quantum dot of the Chemical Formula 1, unlike conventionally known TMSP, does not comprise three silyl ligands of the same structure, but has a ligand structure asymmetric to the central atom phosphorus (P), wherein at least two ligands are silyl groups different from each other, and due to such an asymmetric structure, exhibits complex reactivity.

And, the phosphine precursor for the preparation of a quantum dot of the Chemical Formula 1 of the present invention exhibit faster reaction speed than TMSP, and thus, enables the preparation of a quantum dot at lower temperature than conventional TMSP.

Meanwhile, according to one embodiment of the present invention, one of the $Q_1$ to $Q_3$ may be a trimethylsilyl group(-SiMe$_3$), or two of the $Q_1$ to $Q_3$ may be trimethylsilyl groups.

In the Chemical Formula 1, preferably, $R_1$ to $R_9$ may be each independently, C1-6 linear alkyl, C3-6 branched alkyl, or C6-12 aryl.

More preferably, $R_1$ to $R_9$ may be each independently, methyl, ethyl, n-propyl, iso-propyl, n-butyl, tert-butyl, iso-butyl, or phenyl.

According to one embodiment of the present invention, the compound of the Chemical Formula 1 may be a compound represented by the following Chemical Formula 1-1.

[Chemical Formula 1-1]

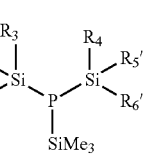

In the Chemical Formula 1-1,
$R_1'$ to $R_6'$ are identical to or different from each other, and each independently, C1-20 linear or branched alkyl, C6-30 aryl, C7-30 alkylaryl, or C7-30 arylalkyl, provided that all $R_1'$ to $R_6'$ are not methyl.

In the Chemical Formula 1-1, preferably, $R_1'$ to $R_6'$ may be each independently, C1-6 linear alkyl(provided that all $R_1'$ to $R_6'$ are not methyl groups), C3-6 branched alkyl, or C6-12 aryl.

More preferably, $R_1'$ to $R_6'$ may be each independently, methyl(provided that all $R_1'$ to $R_6'$ are not methyl groups), ethyl, n-propyl, iso-propyl, n-butyl, tert-butyl, iso-butyl, or phenyl.

According to one embodiment of the present invention, the compound of the Chemical Formula 1 may be a compound represented by the following Chemical Formula 1-2.

[Chemical Formula 1-2]

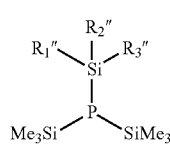

In the Chemical Formula 1-2,
$R_1''$ to $R_3''$ are identical to or different from each other, and each independently, C1-20 linear or branched alkyl, C6-30 aryl, C7-30 alkylaryl, or C7-30 arylalkyl, provided that all $R_1''$ to $R_3''$ are not methyl groups.

In the Chemical Formula 1-2, preferably, $R_1''$ to $R_3''$ may be each independently, C1-6 linear alkyl(provided that all $R_1''$ to $R_3''$ are not methyl groups), C3-6 branched alkyl, or C6-12 aryl.

More preferably, $R_1''$ to $R_3''$ may be each independently, methyl(provided that all $R_1''$ to $R_3''$ are not methyl groups), ethyl, n-propyl, iso-propyl, n-butyl, tert-butyl, iso-butyl, or phenyl.

According to one embodiment of the present invention, the compound of the Chemical Formula 1 may be selected from the group consisting of the following Structural Formulas.

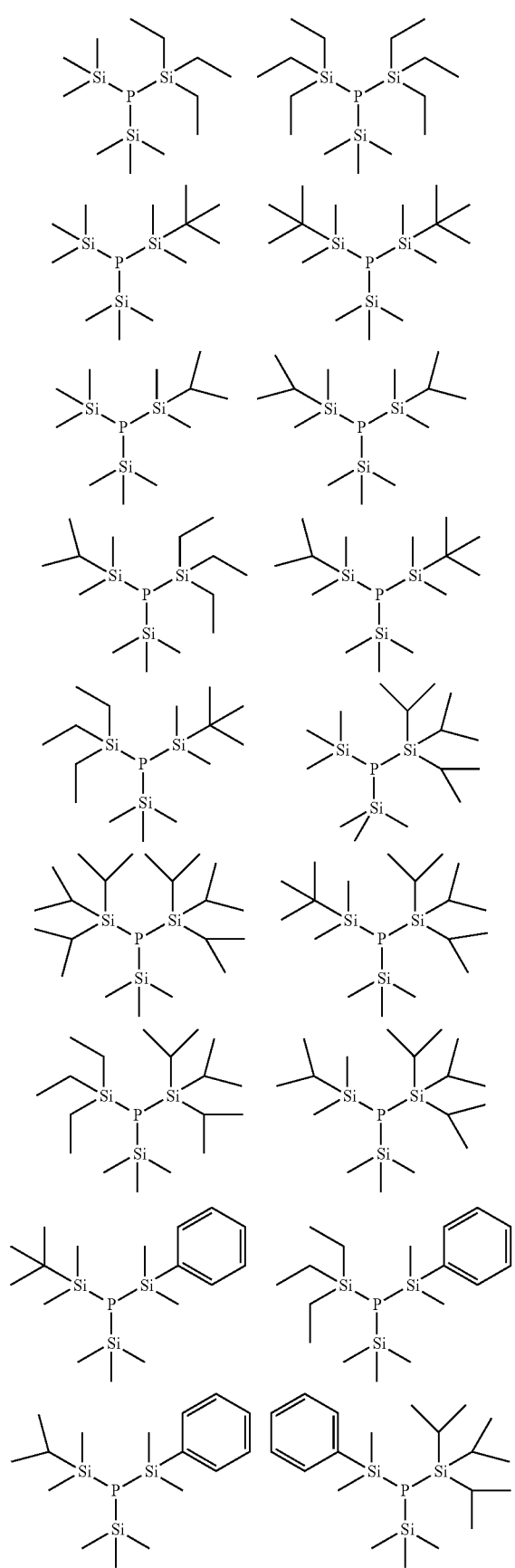
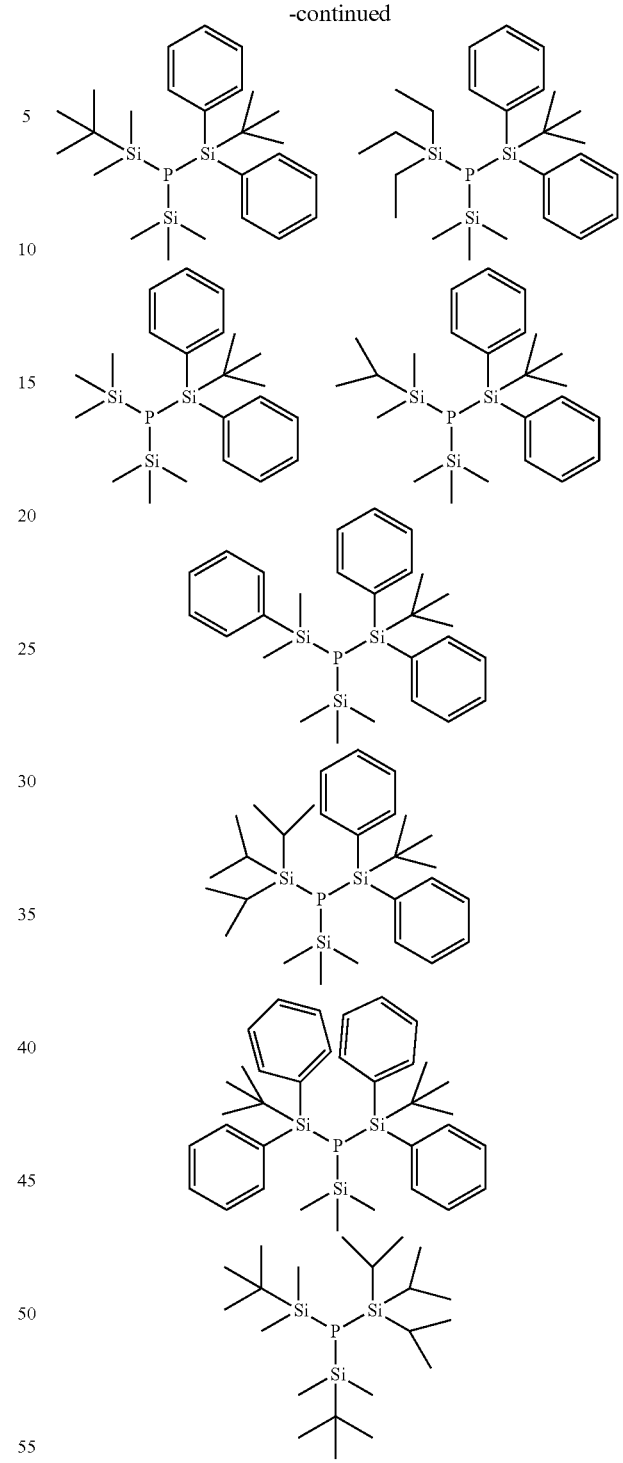

The phosphine precursor for the preparation of a quantum dot of the Chemical Formula 1 may be prepared by reacting a primary or secondary phosphine compound with a silyl triflate compound.

More specifically, a method for preparing the phosphine precursor for the preparation of a quantum dot of the Chemical Formula 1 according to one embodiment comprise the steps of preparing a mixture of a primary phosphine compound, halogenated hydrocarbon, and tertiary amine; and adding a silyl triflate compound to the mixture.

The preparation method may be specifically represented by the following Reaction Formula 1:

[Reaction Formula 1]

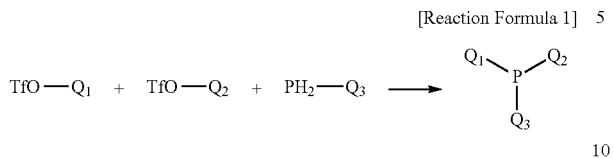

In the Reaction Formula 1, $Q_1$ to $Q_3$ are as defined in the Chemical Formula 1, and TfO is trifluoromethanesulfonate (triflate).

As shown in the Reaction Formula 1, if the reaction between the silyl triflate compounds and primary phosphine is conducted, a tertiary phosphine precursor compound in which remaining hydrogen of the primary phosphine are substituted with $Q_1$ and $Q_2$, respectively, can be obtained.

A method for preparing a precursor for preparing a quantum dot of the Chemical Formula 1 according to another embodiment of the present invention comprises the steps of:

preparing a mixture of a secondary phosphine compound, halogenated hydrocarbon, and tertiary amine; and adding a silyl triflate compound to the mixture.

The preparation method is as shown in the following Reaction Formula 2:

[Reaction Formula 2]

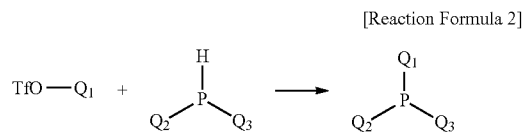

in the Reaction Formula 2, $Q_1$ to $Q_3$ are as defined in the Chemical Formula 1, and TfO is trifluoromethanesulfonate (triflate).

As shown in the Reaction Formula 2, if the reaction between the silyl triflate compound and secondary phosphine compound is conducted, the remaining hydrogen of the secondary phosphine is substituted with $Q_1$, thus obtaining a tertiary phosphine precursor compound.

A method for preparing a precursor for preparing a quantum dot of the Chemical Formula 1 according to yet another embodiment of the present invention comprises the steps of:

preparing a mixture of a primary or secondary phosphine compound, an ether solvent, and alkyl lithium; and adding a silyl halide compound to the mixture.

The preparation method wherein a secondary phosphine compound is used as starting material is as shown in the following Reaction Formula 3:

[Reaction Formula 3]

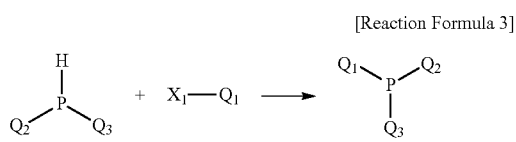

in the Reaction Formula 3, $Q_1$ to $Q_3$ are as defined in the Chemical Formula 1, and $X_1$ means halogen.

The preparation method wherein a primary phosphine compound is used as starting material is as shown in the following Reaction Formula 4:

[Reaction Formula 4]

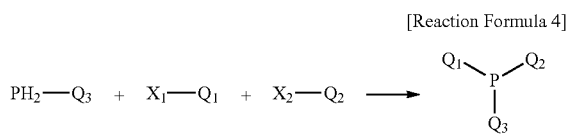

in the Reaction Formula 4, $Q_1$ to $Q_3$ are as defined in the Chemical Formula 1, and each of $X_1$ and $X_2$ independently means halogen.

Hereinafter, the materials used in the preparation method will be explained in detail.

As the ether solvent, tetrahydrofuran (THF) that does not exhibit reactivity with other raw materials may be used.

As the alkyl lithium, butyl lithium(BuLi) may be used.

The halogenated hydrocarbon is commonly polar and is well known as nonflammable material, but is not used as a reaction solvent in a highly reactive reaction using a polar solvent or using a raw material with a fire danger. And, since some hydrogenated halogenated hydrocarbons are decomposed to become acidic and are also used as the oxidant of an oxidation reaction, they are not used in a reaction using highly reactive raw materials. However, in the preparation method of the present invention, it was confirmed that when the halogenated hydrocarbon is used as reaction solvent, mass production process stability is exhibited, and the aimed phosphine precursor compound can be obtained with high yield and high purity, on the contrary.

The halogenated hydrocarbon may be one or more selected from the group consisting of difluoromethane, trifluoromethane, tetrafluoromethane, tetrafluoroethane, pentafluoroethane, hexafluoroethane, dichloromethane, chloroform, carbon tetrachloride, tetrachloroethane, pentachloroethane, hexachloropropane, heptachloropropane, octachloropropane, dibromomethane, tribromomethane, tetrabromomethane, tetrabromoethane, pentabromoethane and hexabromoethane, but is not limited thereto.

The halogenated hydrocarbon does not exhibit reactivity with other raw materials, and is preferably substituted with inexpensive chlorine. Thus, the halogenated hydrocarbon may be one or more selected from the group consisting of dichloromethane, chloroform, carbon tetrachloride, tetrachloroethane, pentachloroethane, hexachloroethane, hexachloropropane, heptachloropropane and octachloropropane, and more preferably, dichloromethane or tetrachloroethane.

The amount of the halogenated hydrocarbon used may be appropriately controlled considering the easiness of handling, reaction stability, reaction yield and product purity.

The tertiary amine may comprise one or more substituents selected from the group consisting of methyl, ethyl, propyl, isopropyl, butyl, isobutyl, t-butyl and phenyl.

The tertiary amine may be selected from the group consisting of trimethylamine, triethylamine, tripropylamine, tributylamine, triphenylamine, dimethylethylamine, methyldiethylamine, dimethylpropylamine, methyldipropylamine, methylethylpropylamine, diethylpropylamine, ethyldipropylamine and ethyldiisopropylamine, and preferably, triethylamine.

The tertiary amine may be used in an amount of 0.5 to 2 molar equivalents, based on 1 mole of the silyl triflate compound.

II. A Precursor Composition for the Preparation of a Quantum Dot

The precursor composition for the preparation of a quantum dot according to another aspect of the present invention comprise the above described phosphine precursor.

The precursor composition for the preparation of a quantum dot comprises the phosphine precursor of the Chemical Formula 1 as explained above. It may comprise only one kind of the phosphine precursor of the Chemical Formula 1, or may comprise two or more kinds of phosphine precursors corresponding to the Chemical Formula 1.

And, according to one embodiment of the present invention, the precursor composition may further comprise tris (trimethylsilyl)phosphine, in addition to the phosphine precursor of the Chemical Formula 1.

In case the precursor composition for the preparation of a quantum dot comprises two or more kinds of the phosphine precursor of the Chemical Formula 1, or further comprises tris(trimethylsilyl)phosphine, the mixing ratio is not specifically limited.

III. Quantum Dot

According to yet another aspect of the present invention, a quantum dot prepared from the phosphine precursor is provided.

According to yet another aspect of the present invention, a method for preparing quantum dot using one or more phosphine precursors is provided.

The quantum dot prepared using the phosphine precursor of the Chemical Formula 1 has narrower full width at half maximum than the quantum dot conventionally prepared using TMSP as a phosphine precursor, and may exhibit excellent luminous efficiency.

Throughout the specification, the description "quantum dot prepared from the phosphine precursor" means a quantum dot prepared using one or more kinds of the phosphine precursors of the Chemical Formula 1 as explained above as a phosphorus source in any step of the preparation steps of a quantum dot, and is not bound to the size, shape or structure of a quantum dot, etc.

According to one embodiment of the present invention, the quantum dot may be a quantum dot comprising InP.

According to one embodiment of the present invention, the quantum dot may be a quantum dot of a core/shell structure consisting of a core layer and a shell layer. More specifically, the quantum dot may be a quantum dot of a core/shell structure comprising InP as a core, and comprising ZnS and/or GaP as a shell.

The quantum dot may be prepared by the preparation method described below.

For example, the preparation method of a quantum dot according to one embodiment of the present invention comprises the steps of heating a mixture of an indium precursor, a zinc precursor, myristic acid and 1-octadecene; cooling the mixture to a room temperature; introducing one or more phosphine precursors of the present invention as explained above, a gallium precursor and 1-octadecene into the cooled mixture, and heating to react them; and introducing dodecanethiol into the reactant, and cooling.

More specifically, a method for preparing a quantum dot comprising InP as a core and comprising ZnS and GaP as a shell is as follow: first, to a mixture of myristic add (MA) and 1-octadecene (ODE), an indium precursor and a zinc precursor are added, and the mixture is heated to 100 to 140° C. (step 1).

The mixture of the step 1 is cooled to a room temperature (step 2).

Next, into the mixture of the step 1 cooled to a room temperature, 1-octadecene, a gallium precursor and the above explained phosphine precursor of the Chemical Formula 1 are introduced. The phosphine precursor of the Chemical Formula 1 may be introduced only one kind, or two or more kinds thereof may be mixed and introduced. And, in addition to the phosphine precursor of the Chemical Formula 1, TMSP may be further mixed and used.

The temperature of the mixture is raised to 200 to 320° C., and the mixture is reacted for 1 to 30 minutes (step 3).

To the reactant of the step 3, dodecanethiol (DDT) is introduced, and then, the reactant is cooled to a room temperature (step 4).

The reactant cooled to a room temperature is precipitated, and then, purified to obtain an InP/GaP/ZnS quantum dot.

The quantum dot obtained using the phosphine precursor of the Chemical Formula 1 of the present invention may exhibit uniform crystal size, excellent luminous efficiency and color purity.

For example, the quantum dot obtained using the phosphine precursor of the present invention may exhibit the effect of improving quantum efficiency and/or full width at half maximum about 1 to about 15%, compared to the case of using TMSP alone under the same conditions.

According to one embodiment of the present invention, the quantum dot obtained using the phosphine precursor of the present invention may exhibit full width at half maximum, of about 35 to about 60 nm, or about 40 to about 60 nm, And, the quantum dot obtained using the phosphine precursor of the present invention may have a particle diameter in the range of about 2 to about 5 nm.

The quantum dot obtained using the phosphine precursor of the present invention is expected to be diversely applied for various devices such as light emitting diode (LED), display, organic/inorganic hybrid electroluminescent device, inorganic electroluminescent device, solar cell, transistor, etc.

Hereinafter, the actions and the effects of the present invention will be explained in detail through specific examples. However, these examples are presented only as the illustrations of the invention, and the scope of the right of the invention is not determined thereby.

EXAMPLE

All the following Examples and Comparative Examples were progressed under an inert environment. The analysis was conducted using NMR analyzer at 600 MHz under benzene anhydrous-$D_6$ solvent, and using GC-MS under an inert environment. For all the solvents used for the reaction and analysis, moisture was removed using a molecular sieve before use.

<Preparation Example of a Phosphine Precursor>

Example 1: Synthesis of (t-butyldimethylsilyl)bis (trimethylsilyl)phosphine, (t-BuMe$_2$Si)(Me$_3$Si)$_2$P

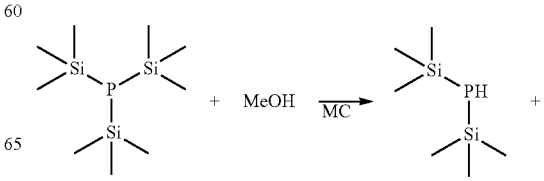

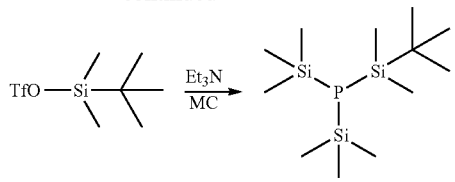

Step 1: Preparation of bis(trimethylsilyl)phosphine

In a 2 L round-bottom three-neck flask of nitrogen atmosphere, 30 g of tris(trimethylsilyl)phosphine was added to 500 ml of dichloromethane, and the mixture was cooled to 0° C. While maintaining the temperature at 0° C., 3.8 g of methanol was added dropwise for 1 hour. The produced bis(trimethylsilyl)phosphine was used in the subsequent process without a separate purification process.

Step 2: Preparation of (tert-butyldimethylsilyl)(trimethylsilyl)phosphine

The bis(trimethylsilyl)phosphine prepared in step 1 was diluted in 200 ml of MC, and 35.4 g of Et$_3$N was added to cool to 0° C., and then, 32.7 g of tert-butyldimethyl silyl triflate was added dropwise for 1 hour. The obtained reactant was vacuum distilled without filtration, thus obtaining 15.1 g of the target compound (t-butyldimethylsilyl)bis(trimethylsilyl)phosphine (yield: 43%).

MS (ESI): [M+H]$^+$ 292
$^1$H NMR(600 MHz, benzene-d$_6$): δ 0.95 (s, 9H), 0.26 (d, 18H), 0.20 (d, 6H)
$^{31}$P NMR(243 MHz, benzene-d$_6$): δ −261.5 (s)

Example 2: Synthesis of bis(t-butyldimethylsilyl)(trimethylsilyl)phosphine, (t-BuMe$_2$Si)$_2$(Me$_3$Si)P

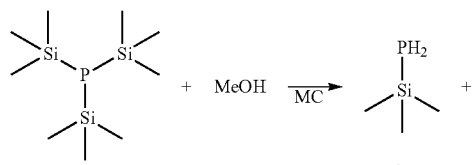

Step 1: Preparation of trimethylsilyl phosphine

In a 2 L round-bottom three-neck flask of nitrogen atmosphere, 30 g of tris(trimethylsilyl)phosphine was added to 500 ml of dichloromethane, and the mixture was cooled to 0° C. While maintaining the temperature at 0° C., 7.6 g of methanol was added dropwise for 1 hour. The produced trimethylsilyl phosphine was used in the subsequent process without a separate purification process.

Step 2: Preparation of bis(tert-butyldimethylsilyl)(trimethylsilyl)phosphine The trimethylsilyl phosphine prepared in step 1 was diluted in 200 ml of MC, and 70.8 g of Et$_3$N was added to cool to 0° C., and then, 62.4 g of tert-butyldimethyl silyl triflate was added dropwise for 1 hour. The obtained reactant was vacuum distilled without filtration, thus obtaining 10.2 g of the target compound (tert-butyldimethyl silyl)(trimethyl silyl)phosphine (yield 25%).

MS (ESI): [M+H]$^+$ 334
$^1$H NMR(600 MHz, benzene-d$_6$): δ 0.97 (s, 18H), 0.30 (d, 9H), 0.25 (d, 12H)
$^{31}$P NMR(243 MHz, benzene-d$_6$): δ −271.9 (s)

Example 3: Synthesis of (dimethylphenylsilyl)bis(trimethylsilyl)phosphine, (PhMe$_2$Si)(Me$_3$Si)$_2$P

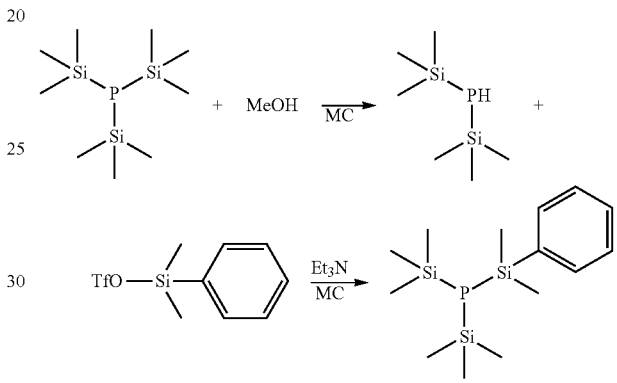

13.1 g (yield: 35%) of (dimethylphenylsilyl)bis(trimethylsilyl)phosphine was obtained by the same method as Example 1, except that 34.1 g of dimethylphenyl silyl triflate was used instead of tert-butyldimethyl silyl triflate.

MS (ESI): [M+H]$^+$ 312
$^1$H NMR(600 MHz, benzene-d$_6$): δ 7.60-7.59 (m, 2H), 7.15-7.05 (m, 3H), 0.48, (d, 6H), 0.15 (d, 18H)
$^{31}$P NMR(243 MHz, benzene-d$_6$): δ −250.8 (s)

Example 4: Synthesis of bis(dimethylphenylsilyl)(trimethylsilyl)phosphine, (PhMe$_2$Si)$_2$(Me$_3$Si)P

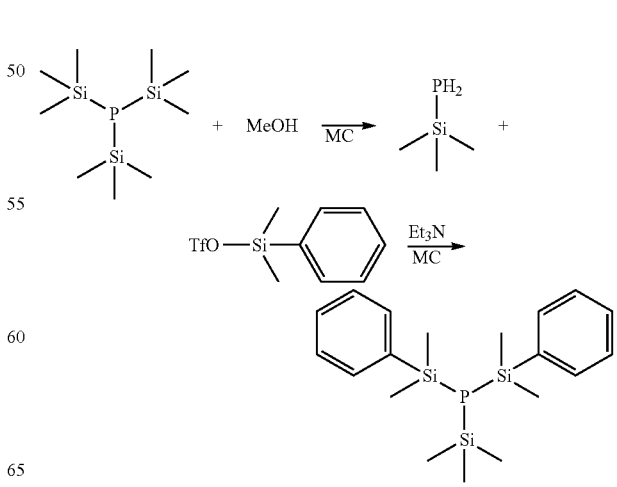

7.6 g (yield: 17%) of bis(dimethylphenylsilyl)(trimethylsilyl)phosphine was obtained by the same method as Example 2, except that 68.2 g of dimethylphenyl silyl triflate was used instead of tert-butyldimethylsilyl triflate.

MS (ESI): [M+H]$^+$ 374

$^1$H NMR(600 MHz, benzene-d$_6$): δ 7.56-7.53 (,m, 2H), 7.15-7.05 (m, 3H), 0.39, (d, 12H), 0.01 (d, 9H)

$^{31}$P NMR(243 MHz, benzene-d$_6$): δ −249.4 (s)

Example 5: Synthesis of (trisisopropylsilyl)bis(trimethylsilyl)phosphine), (i-Pr$_3$Si)(Me$_3$Si)$_2$P

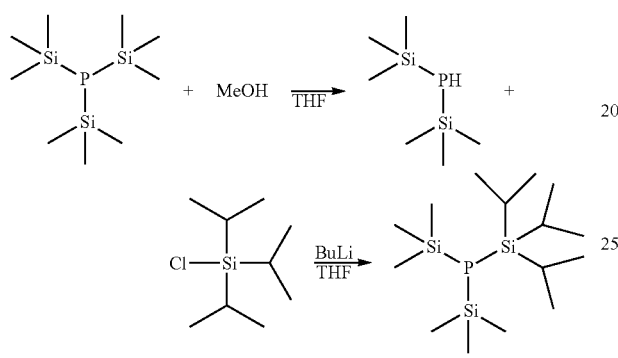

Step 1: Preparation of bis(trimethylsilyl)phosphine

In a 2 L round-bottom three-neck flask of nitrogen atmosphere, 30 g of tris(trimethylsilyl)phosphine was added to 200 ml of THF, and the mixture was cooled to 0° C. While maintaining the temperature at 0° C., 3.8 g of methanol was added dropwise for 1 hour. The produced bis(trimethylsilyl) phosphine was used in the subsequent process without a separate purification process.

Step 2: Preparation of (trisisopropylsilyl)bis(trimethylsilyl)phosphine

The mixture of bis(trimethylsilyl)phosphine prepared in step 1 was cooled to −20° C., and then, 38.4 ml of 2.5M butyl lithium(BuLi) in hexane was added dropwise for 20 minutes. After the addition of butyl lithium was completed, the temperature of the reaction solution was raised to room temperature, and the solution was additionally stirred for 1 hour. The reaction solution was cooled again to −20° C., and then, 20.8 g of trisisopropylsilyl chloride(i-Pr$_3$SiCl) was added dropwise for 10 minutes. After the addition was completed, the temperature of the reaction solution was raised to room temperature, and the solution was additionally stirred at room temperature for 3 hours to progress the reaction.

The obtained reaction mixture was concentrated to remove THF, and then, 150 ml of hexane was introduced. The precipitate produced after adding hexane was vacuum filtered to remove, and then, the filtrate was concentrated. The obtained reactant was vacuum distilled to obtain 28.1 g of the target compound (trisisopropylsilyl)bis(trimethylsilyl) phosphine) (yield: 70%).

MS (ESI): [M+H]$^+$ 334

$^1$H NMR(600 MHz, benzene-d$_6$): δ 1.20-1.10(m, 21H), 0.30 (d, 18H)

$^{31}$P NMR(243 MHz, benzene-d$_6$): δ −267.4 (s)

Example 6: Synthesis of bis(trisisopropylsilyl)(trimethylsilyl)phosphine, (i-Pr$_3$Si)$_2$(Me$_3$Si)P

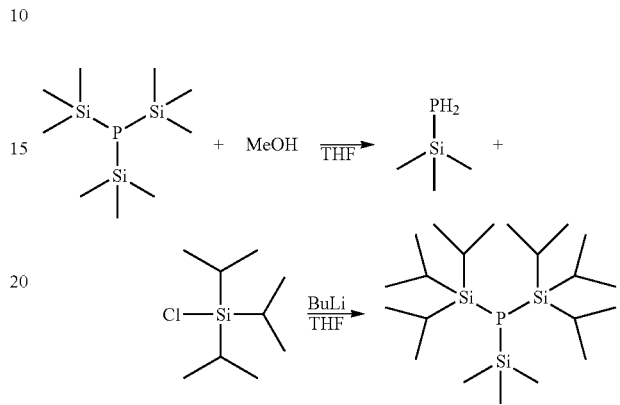

Step 1: Preparation of trimethylsilyl phosphine

In a 2 L round-bottom three-neck flask of nitrogen atmosphere, 30 g of tris(trimethylsilyl)phosphine was added to 500 ml of dichloromethane, and the mixture was cooled to 0° C. While maintaining the temperature at 0° C., 7.6 g of methanol was added dropwise for 1 hour. The produced trimethylsilyl phosphine was used in the subsequent process without a separate purification process.

Step 2: Preparation of bis(trisisopropylsilyl)(trimethyl)silyl phosphine

The mixture of bis(trimethylsilyl)phosphine prepared in step 1 was cooled to −20° C., and then, 76.8 ml of 2.5M butyl lithium(BuLi) in hexane was added dropwise for 20 minutes. After the addition of butyl lithium was completed, the temperature of the reaction solution a raised to room temperature, and the solution was additionally stirred for 1 hour. The reaction solution was cooled again to −20° C., and then. 41.6 g of trisisopropylsilyl chloride(i-Pr$_3$SiCl) was added dropwise for 10 minutes. After the addition was completed, the temperature of the reaction solution was raised to room temperature, and the solution was additionally stirred at room temperature for 3 hours to progress the reaction.

The obtained reaction mixture was concentrated to remove THF, and then, 150 ml of hexane was introduced. The precipitate produced after adding hexane was vacuum filtered to remove, and then, the filtrate was concentrated. The obtained reactant was vacuum distilled to obtain 28.1 g of the target compound bis(trisisopropylsilyl)(trimethylsilyl) phosphine (yield: 56%).

MS (ESI): [M+H]$^+$ 418

$^1$H NMR(600 MHz, benzene-d$_6$): δ 1.15-1.05 (m, 42H), 0.28 (d, 9H)

$^{31}$P NMR(243 MHz, benzene-d$_6$): δ −273.7 (s)

Example 7: Synthesis of (isopropyldimethylsilyl)bis(trimethylsilyl)phosphine, (i-PrMe₂Si)(Me₃Si)₂P

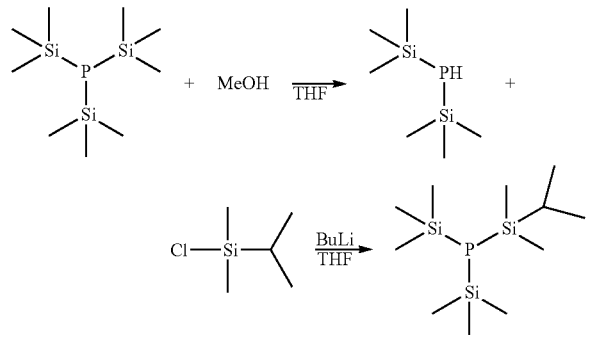

Step 1: Preparation of bis(trimethylsilyl)phosphine

In a 2 L round-bottom three-neck flask of nitrogen atmosphere, 30 g of tris(trimethylsilyl)phosphine was added to 200 ml of THE, and the mixture was cooled to 0° C. While maintaining the temperature at 0° C., 3.8 g of methanol was added dropwise for 1 hour. The produced bis(trimethylsilyl)phosphine was used in the subsequent process without a separate purification process.

Step 2: Preparation of (isopropyldimethylsilyl)bis(trimethylsilyl)phosphine

The mixture of bis(trimethylsilyl)phosphine prepared in step 1 was cooled to −20° C., and then, 38.4 ml of 2.5M butyl lithium(BuLi) in hexane was added dropwise for 20 minutes. After the addition of butyl lithium was completed, the temperature of the reaction solution was raised to room temperature, and the solution was additionally stirred for 1 hour. The reaction solution was cooled again to −20° C., and then, 14.8 g of isopropyldimethylsilyl chloride(i-PrMe₂SiCl) was added dropwise for 10 minutes. After the addition was completed, the temperature of the reaction solution was raised to room temperature, and the solution was additionally stirred at room temperature for 3 hours to progress the reaction.

The obtained reaction mixture was concentrated to remove THF, and then, 150 ml of hexane was introduced. The precipitate produced after adding hexane was vacuum filtered to remove, and then, the filtrate was concentrated. The obtained reactant was vacuum distilled to obtain 21.7 g of the target compound (isopropyldimethylsilyl)bis(trimethylsilyl)phosphine (yield: 65%).

MS (ESI): [M+H]⁺ 278
¹H NMR(600 MHz, benzene-d₆): δ 1.03(d, 6H), 0.93 (m, 1H), 0.25 (d, 18H), 0.19 (d, 6H)
³¹P NMR(243 MHz, benzene-d₆): δ −259.2 (s)

Example 8: Synthesis of bis(isopropyldimethylsilyl)(trimethylsilyl)phosphine, (i-PrMe₂Si)₂(Me₃Si)P

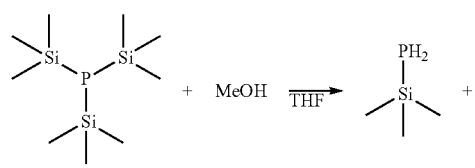

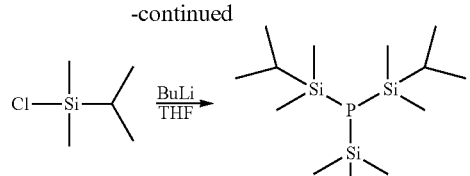

Step 1: Preparation of trimethylsilyl phosphine

In a 2 L round-bottom three-neck flask of nitrogen atmosphere, 30 g of tris(trimethylsilyl)phosphine was added to 500 ml of dichloromethane, and the mixture was cooled to 0° C. While maintaining the temperature at 0° C., 7.6 g of methanol was added dropwise for 1 hour. The produced trimethylsilyl phosphine was used in the subsequent process without a separate purification process.

Step 2: Preparation of bis(isopropyldimethylsilyl)(trimethylsilyl)phosphine

The mixture of trimethylsilyl phosphine prepared in step 1 was cooled to −20° C., and then, 76.8 ml of 2.5M butyl lithium(BuLi) in hexane was added dropwise for 20 minutes. After the addition of butyl lithium was completed, the temperature of the reaction solution was raised to room temperature, and the solution was additionally stirred for 1 hour. The reaction solution was cooled again to −20° C., and then, 29.6 g of isopropyldimethylsilyl chloride(i-PrMe₂SiCl) was added dropwise for 10 minutes. After the addition was completed, the temperature of the reaction solution was raised to room temperature, and the solution was additionally stirred at room temperature for 3 hours to progress the reaction.

The obtained reaction mixture was concentrated to remove THF, and then, 150 ml of hexane was introduced. The precipitate produced after adding hexane was vacuum filtered to remove, and then, the filtrate was concentrated. The obtained reactant was vacuum distilled to obtain 18.7 g of the target compound bis(isopropyldimethylsilyl)(trimethylsilyl)phosphine) (yield: 51%).

MS (ESI): [M+H]⁺ 306
¹H NMR(600 MHz, benzene-d₆): δ 1.05(d, 12H), 0.97 (m, 2H), 0.26 (d, 9H), 0.17 (d, 12H)
³¹P NMR(243 MHz, benzene-d₆): δ −267.0 (s)

Example 9: Synthesis of bis(tert-butyldimethylsilyl)(trisisopropylsilyl)phosphine, (t-BuMe₂Si)₂(i-Pr₃Si)PH

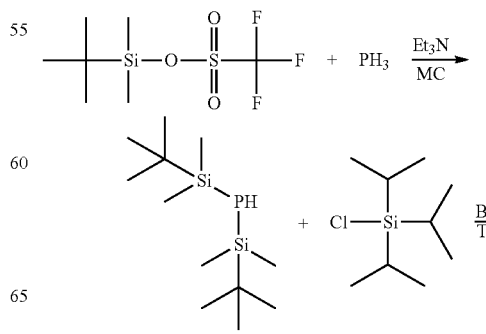

-continued

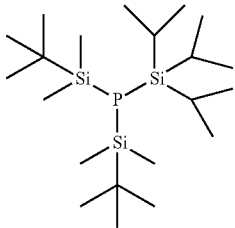

Step 1: Preparation of bis(tert-butyldimethylsilyl)phosphine

In a 2 L round-bottom three-neck flask of nitrogen atmosphere, at room temperature, 100 g of tert-butyldimethylsilyl triflate and 61 g of triethyl amine were added to 1 L of dichloromethane, and stirred and mixed. While maintaining the temperature of the mixture at 25° C. or less, phosphine ($PH_3$) gas was introduced at 3 ml/min. When total 17 g of phosphine was introduced, the introduction of phosphine was stopped. The obtained reactant in the form of a mixture was vacuum distilled without filtration to obtain 52.4 g of (bis(tert-butyldimethylsilyl)phosphine (yield: 50%).

MS (ESI): [M+H]$^+$ 262
$^1$H NMR(600 MHz, benzene-$d_6$): δ 0.92 (s, 18H), 0.14 (d, 12H)
$^{31}$P NMR(243 MHz, benzene-$d_6$): δ −262.2 (s)

Step 2: Preparation of bis(tert-butyldimethylsilyl)(trisisopropylsilyl)phosphine 52.4 g of the bis(tert-butyldimethylsilyl)phosphine prepared in step 1 was cooled to −20° C., and then, 64 ml of 2.5M butyl lithium(BuLi) in hexane was added dropwise for 30 minutes. After the addition of butyl lithium was completed, the temperature of the reaction solution was raised to room temperature, and the solution was additionally stirred for 1 hour. The reaction solution was cooled again to 20° C., and then, 34.7 g of trisisopropylsilyl chloride(i-Pr$_3$SiCl) was added dropwise for 10 minutes. After the addition was completed, the temperature of the reaction solution was raised to room temperature, and the solution was additionally stirred at room temperature for 3 hours to progress the reaction.

The obtained reaction mixture was concentrated to remove THF, and then, 150 ml of hexane was introduced. The precipitate produced after adding hexane was vacuum filtered to remove, and then, the filtrate was concentrated. The obtained reactant was vacuum distilled to obtain 67.9 g of the target compound (bis(tert-butyldimethylsilyl)(trisisopropylsilyl)phosphine (yield: 81%).

MS (ESI): [M+H]$^+$ 418
$^1$H NMR(600 MHz, benzene-$d_6$): δ 1.25-1.15 (m, 21H), 0.94 (s, 18H), 0.28 (d, 12H)
$^{31}$F NMR(243 MHz, benzene-$d_6$): δ −288.5 (s)

<Preparation Example of Quantum Dot>

Example 10

To the mixed solution(1) of 70 mg(0.24 mmol) of indium acetate(In(Ac)$_3$), 183 mg(1 mmol) of zinc acetate(Zn(Ac)$_2$), 496 mg(2.17 mmol) of myristic acid (MA) and 4 ml of 1-octadecene (ODE) in a 25 ml three-neck flask, vacuum was applied and the mixed solution was heated to 110° C. for 2 hours.

The mixed solution(1) was cooled to a room temperature. To the mixed solution(1) cooled to a room temperature, a solution of 15 mg of gallium chloride(GaCl$_3$) dissolved in 1 ml of 1-octadecene was added. And, continuously, a solution of 55.5 mg(0.19 mmol) of (tert-butyldimethylsilyl)bis(trimethylsilyl)phosphine obtained in Example 1, dissolved in 1 ml of 1-octadecene(ODE), was added to prepare a mixed solution(2).

The temperature of the mixed solution(2) was raised to 300° C., and then, it was heated to 300° C. for 10 minutes.

0.25 ml(1 mmol) of dodecanethiol(DDT) was added to the mixed solution(2), and then, the solution was cooled to a room temperature.

To the mixed solution(2) cooled to a room temperature, a mixed solution of excessive amounts of methanol and butanol was added to precipitate, and then, it was filtered and dried to obtain a quantum dot (hereinafter, referred to as an InP/GaP/ZnS quantum dot) comprising InP as a core and comprising ZnS and GaP as a shell.

Example 11

A InP/GaP/ZnS quantum dot was prepared by the same method as Example 10, except that 63.5 mg(0.19 mmol) of bis(tert-butyldimethylsilyl)(trimethylsilyl)phosphine obtained in Example 2 was used instead of (tert-butyldimethylsilyl)bis(trimethylsilyl)phosphine of Example 1 in Example 10.

Example 12

A InP/GaP/ZnS quantum dot was prepared by the same method as Example 10, except that 59.3 mg(0.19 mmol) of (dimethylphenylsilyl)bis(trimethylsilyl)phosphine obtained in Example 3 was used instead of (tert-butyldimethylsilyl)bis(trimethylsilyl)phosphine of Example 1 in Example 10.

Example 13

A InP/GaP/ZnS quantum dot was prepared by the same method as Example 10, except that 71.1 mg(0.19 mmol) of bis(dimethylphenylsilyl)(trimethylsilyl)phosphine obtained in Example 4 was used instead of (tert-butyldimethylsilyl)bis(trimethylsilyl)phosphine of Example 1 in Example 10.

Example 14

A InP/GaP/ZnS quantum dot was prepared by the same method as Example 10, except that 63.5 mg(0.19 mmol) of (trisisopropylsilyl)bis(trimethylsilyl)phosphine obtained in Example 5 was used instead of (tert-butyldimethylsilyl)bis(trimethylsilyl)phosphine of Example 1 in Example 10.

Example 15

A InP/GaP/ZnS quantum dot was prepared by the same method as Example 10, except that 79.6 mg(0.19 mmol) of bis(trisisopropylsilyl)(trimethylsilyl)phosphine obtained in Example 6 was used instead of (tert-butyldimethylsilyl)bis(trimethylsilyl)phosphine of Example 1 in Example 10.

Example 16

A InP/GaP/ZnS quantum dot was prepared by the same method as Example 10, except that 52.9 mg(0.19 mmol) of (isopropyldimethylsilyl)bis(trimethylsilyl)phosphine obtained in Example 7 was used instead of (tert-butyldimethylsilyl)bis(trimethylsilyl)phosphine of Example 1 in Example 10.

Example 17

A InP/GaP/ZnS quantum dot was prepared by the same method as Example 10, except that 58.3 mg(0.19 mmol) of bis(isopropyldimethylsilyl)(trimethylsilyl)phosphine obtained in Example 8 was used instead of (tert-butyldimethylsilyl)bis(trimethylsilyl)phosphine of Example 1 in Example 10.

Example 18

A InP/GaP/ZnS quantum dot was prepared by the same method as Example 10, except that 79.6 mg(0.19 mmol) of bis(tert-butyldimethylsilyl)(trisisopropylsilyl)phosphine obtained in Example 9 was used instead of (tert-butyldimethylsilyl)bis(trimethylsilyl)phosphine of Example 1 in Example 10.

Comparative Example 1

A InP/GaP/ZnS quantum dot was prepared by the same method as Example 10, except that (tert-butyldimethylsilyl) bis(trimethylsilyl)phosphine of Example 1 was not used, but 55.6 mg(0.19 mmol) of tris(trimethylsilyl)phosphine was used.

Experimental Example

Experimental Example 1: Evaluation of Optical Properties of InP/GaP/ZnS Quantum Dots In order to find out the optical properties of the quantum dots prepared in Examples and Comparative Examples, the optical properties of the InP/GaP/ZnS quantum dots prepared in Example 10 and Comparative Example 1 were measured using a fluorophotometer (device name: Perkin Ener—LS55), and the results were shown in the following Table 1.

The graph of light emission according to the wavelength of the quantum dots of Example 10 of the present invention and Comparative Example 1 were shown in FIG. 1.

TABLE 1

| Quantum dot | Phosphine precursor | FWHM (nm) |
|---|---|---|
| Example 10 | Compound of Example 1 | 60 |
| Comparative Example 1 | TMSP | 62 |

The FWHM(full width at half maximum) in the Table 1 means that of light emission peak, and the smaller FWHM means that a quantum dot with more uniform size and high purity is prepared.

Comparative Example 1 prepared a quantum dot using only tris(trimethylsilylphosphine)(TMSP), which is a known phosphine precursor.

Comparing the FWHM of the quantum dot of Example 10 wherein bis(tert-butyldimethylsilyl)phosphine, which is the phosphine precursor of the present invention, is used to prepare a quantum dot, with the FWHM of the quantum dot of Comparative Example 1, it is confirmed that FWHM decreased about 3%. Thus, it can be seen that if a quantum dot is prepared using the novel phosphine precursor of the present invention, a quantum dot with excellent properties, which has a uniform size and high purity, can be prepared.

What is claimed is:

1. A method for preparing a phosphine precursor represented by the following Chemical Formula 1, comprising the steps of:
preparing a mixture of (i) a primary phosphine compound having the formula $Q_1PH_2$ or a secondary phosphine compound having the formula $Q_1Q_2PH$, (ii) an ether solvent, and (iii) alkyl lithium; and
adding a silyl halide compound to the mixture:

[Chemical Formula 1]

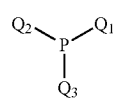

in the Chemical Formula 1,
$Q_1$ is

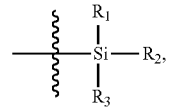

$Q_2$ is

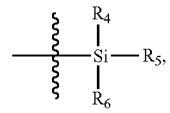

$Q_3$ is

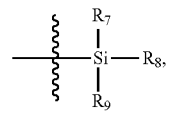

wherein $R_1$ to $R_9$ are identical to or different from each other, and each independently, C1-20 linear or branched alkyl, C6-30 aryl, C7-30 alkylaryl, or C7-30 arylalkyl, and
wherein at least one pair selected from the group consisting of (i) $Q_1$ and $Q_2$, (ii) $Q_1$ and $Q_3$, and (iii) $Q_2$ and $Q_3$ are different from each other.

2. The method for preparing a phosphine precursor according to claim 1, wherein the ether solvent is tetrahydrofuran and the alkyl lithium is butyl lithium.

3. The method for preparing a phosphine precursor according to claim 1, wherein $R_1$ to $R_9$ are each independently C1-6 linear alkyl, C3-6 branched alkyl, or C6-12 aryl.

4. The method for preparing a phosphine precursor according to claim 1, wherein $R_1$ to $R_9$ are each independently methyl, ethyl, n-propyl, iso-propyl, n-butyl, tert-butyl, iso-butyl, or phenyl.

5. The method for preparing a phosphine precursor according to claim 1, wherein the compound of the Chemical Formula 1 is selected from the group consisting of the following Structural Formulas:

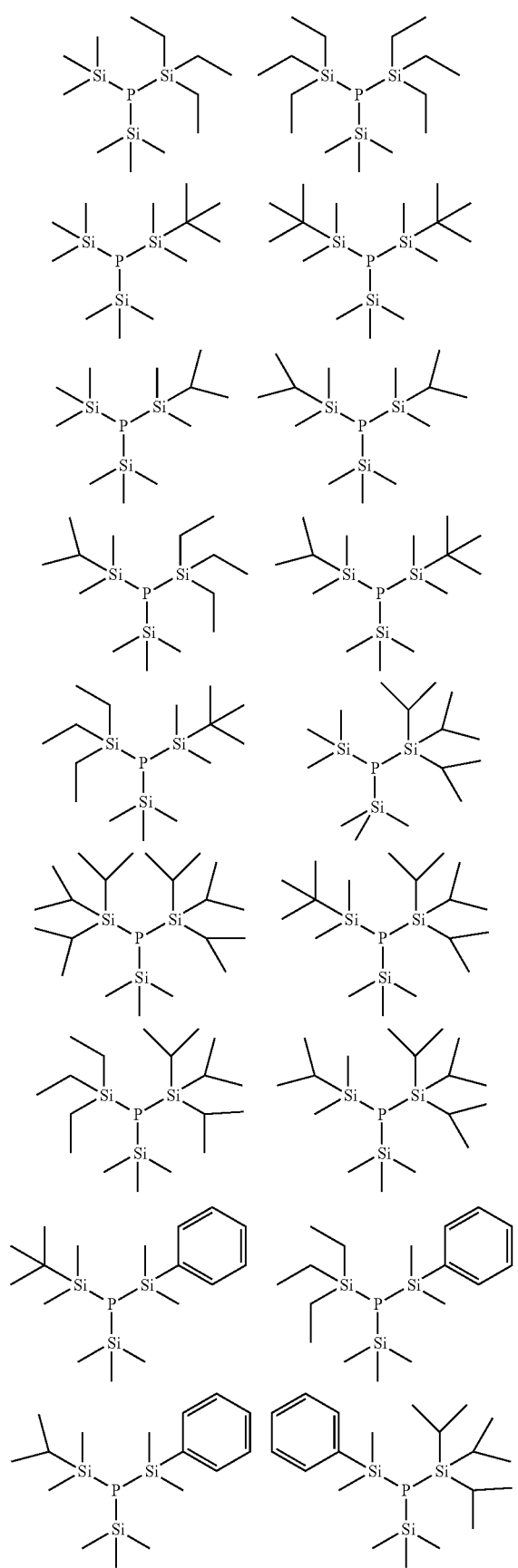
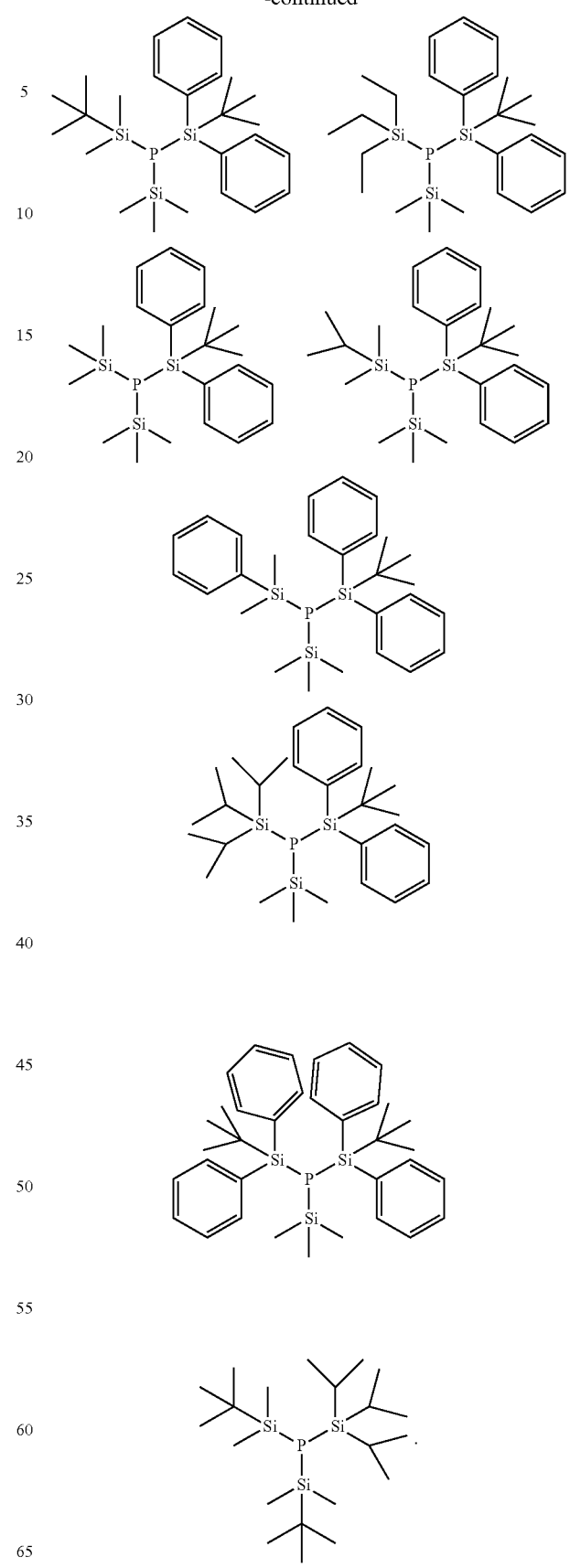
-continued

6. The method for preparing a phosphine precursor according to claim 1, wherein the compound of the Chemical Formula 1 is selected from the group consisting of the following Structural Formulas:
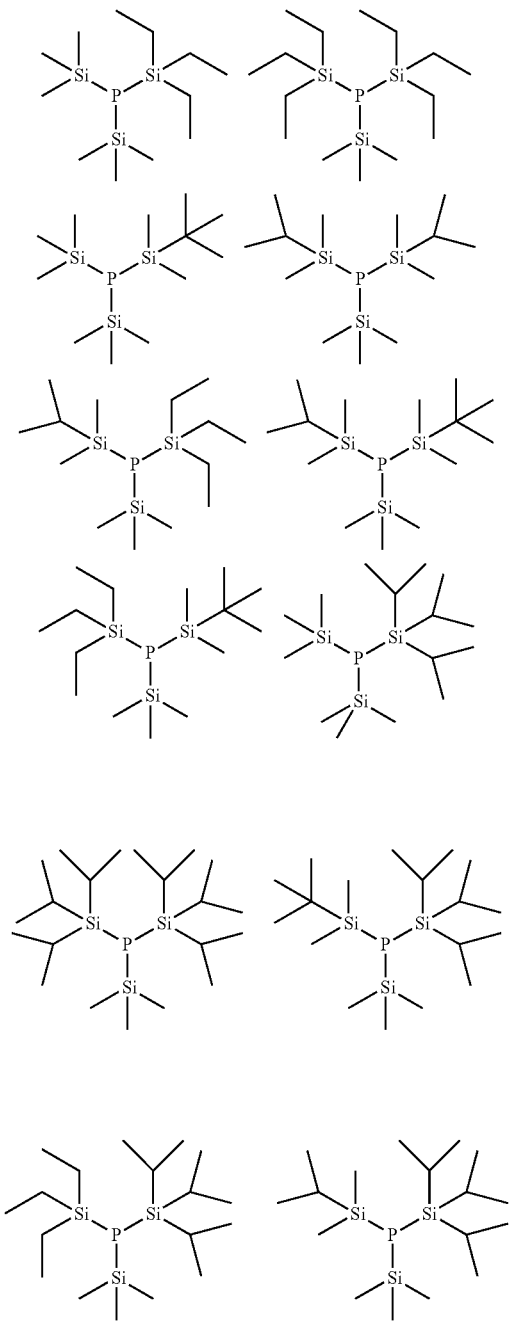
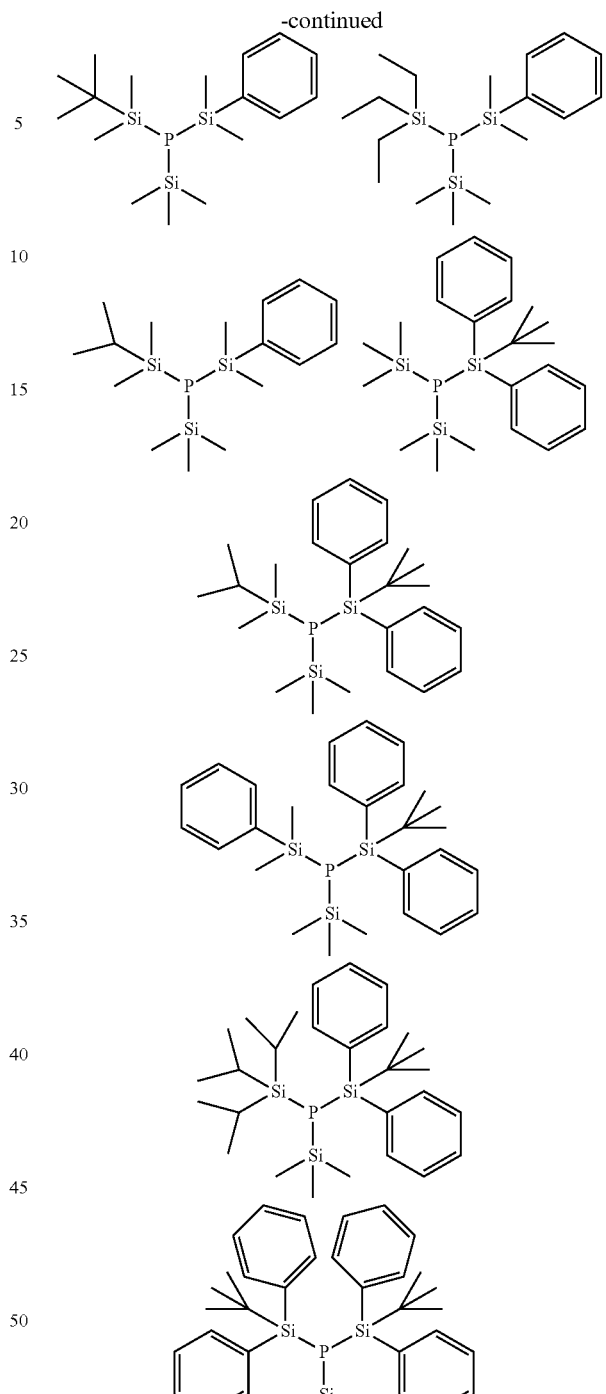
* * * * *